(12) United States Patent
Wang

(10) Patent No.: US 6,276,659 B1
(45) Date of Patent: Aug. 21, 2001

(54) PUSHBUTTON CONTROLLED VALVE

(76) Inventor: Tzu-Meng Wang, No. 91, Kwo-Tai Rd., Chu-Nan Chen, Miao-Li Hsien (TW)

( * ) Notice: Subject to any disclaimer, the term of this patent is extended or adjusted under 35 U.S.C. 154(b) by 0 days.

(21) Appl. No.: 09/602,856

(22) Filed: Jun. 26, 2000

(51) Int. Cl.$^7$ .................................................. F16K 31/44
(52) U.S. Cl. ............................................ 251/58; 251/230
(58) Field of Search ...................................... 251/58, 230

(56) References Cited

U.S. PATENT DOCUMENTS

| | | | |
|---|---|---|---|
| 3,220,695 | * 11/1965 | Downey et al. | 251/230 |
| 3,333,815 | * 8/1967 | Downey et al. | 251/330 |
| 4,344,457 | * 8/1982 | Caroli | 137/597 |
| 4,729,406 | * 3/1988 | Frentzel | 137/624.14 |
| 5,704,397 | * 1/1998 | Lu | 251/230 |

* cited by examiner

Primary Examiner—John Fox
(74) Attorney, Agent, or Firm—Jackson Walker L.L.P.

(57) ABSTRACT

A valve has a pushbutton assembly and a piston assembly. The valve has a chamber defined to receive therein the piston assembly and the pushbutton assembly. The piston assembly is controlled by the pushbutton assembly to activate the communication between the chamber in the body of the valve and the inlet of the body. The pushbutton assembly has a pushbutton movably received in the body to control an engagement of a piston of the piston assembly to the chamber so as that the the water flow out of the outlet is controlled by the movement of the pushbutton.

11 Claims, 11 Drawing Sheets

PUSHBUTTON CONTROLLED VALVE

BACKGROUND OF THE INVENTION

1. Field of the Invention

The present invention relates to a valve, and more particularly to a pistol-grip valve having a body provided with an inlet, an outlet, a control chamber defined to communicate with the outlet and a pushbutton assembly to control the water flow.

2. Description of Related Art

Valves, especially for use in gardening and water supply system, have been widely used throughout the world. The current available valve normally has a handle attached with a hose at the inlet thereof and a spray head at the outlet and a trigger pivotally connected to the handle to control the operation of a valve in the valve. The design of the valve is not suitable for a user to operate for a long period of time because the user will have to apply a force to the trigger continuously, which causes muscle fatigue. To solve the problem, there is a securing device provided to maintain the valve open so as to continuously keep the valve in operation and solve the muscle fatigue problem. Although, the design does have the function to meet the user's requirement, the design still has its shortcoming. Obviously, hand sizes vary all over the world, and even now people of one country or continent may generally have a hand size different to those of another. If valves are made to one international size, users in one region may find the handle too small while those elsewhere might find it too big. Thus, some users will find it very difficult to apply a force properly and comfortably. Furthermore, the valve manufacturer is not like the shoe maker that is able to make shoes according to the customers' different requirements and sizes. The valve manufacturer can only make valves in one size, which brings a lot of inconvenience to different users.

To overcome the shortcomings, the present invention tends to provide an improved valve to mitigate and obviate the aforementioned problems.

SUMMARY OF THE INVENTION

The primary objective of the invention is to provide an improved valve having a pushbutton to control the water flow, such that the user will not have to hold the trigger during the entire operation process. The pushbutton is able to maintain the valve open or close depending on the user's choice. Therefore, the valve having a pushbutton undoubtedly brings convenience and comfort to the user.

Other objects, advantages and novel features of the invention will become more apparent from the following detailed description when taken in conjunction with the accompanying drawings.

DETAILED DESCRIPTION OF PREFERRED EMBODIMENT

Figure 1:
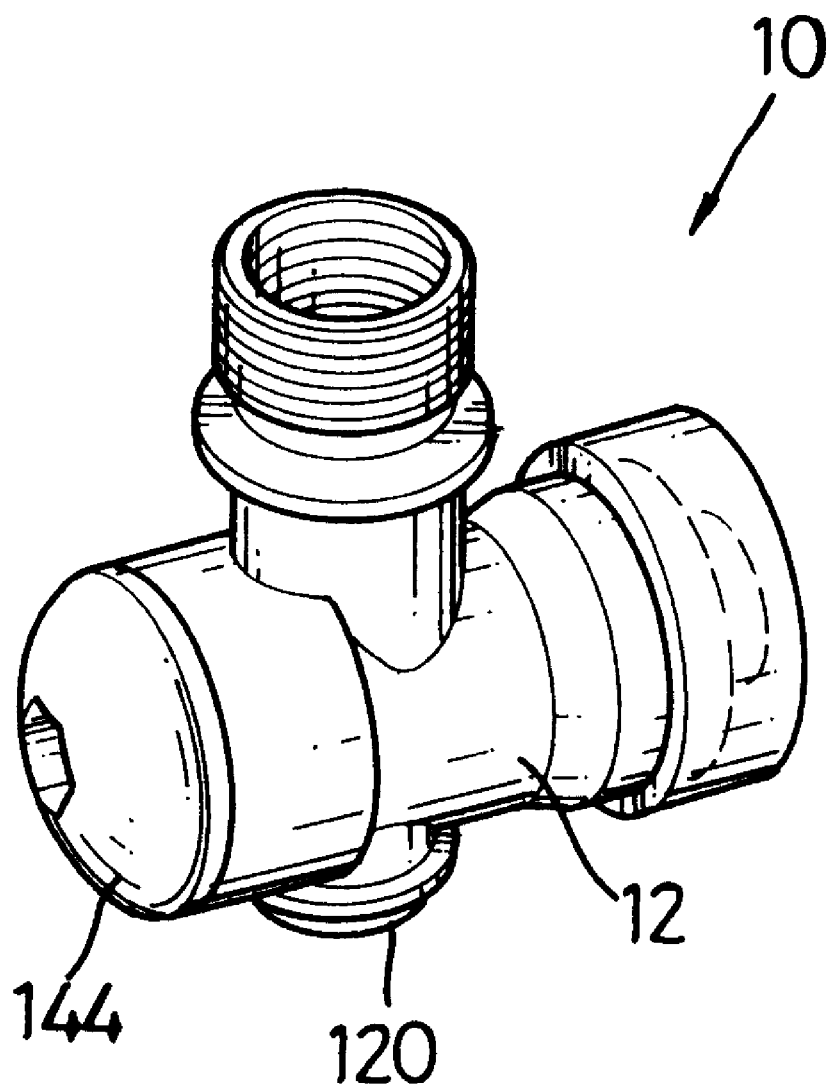
FIG. 1 is a perspective view of the valve constructed in accordance with the present invention.
Figure 2:
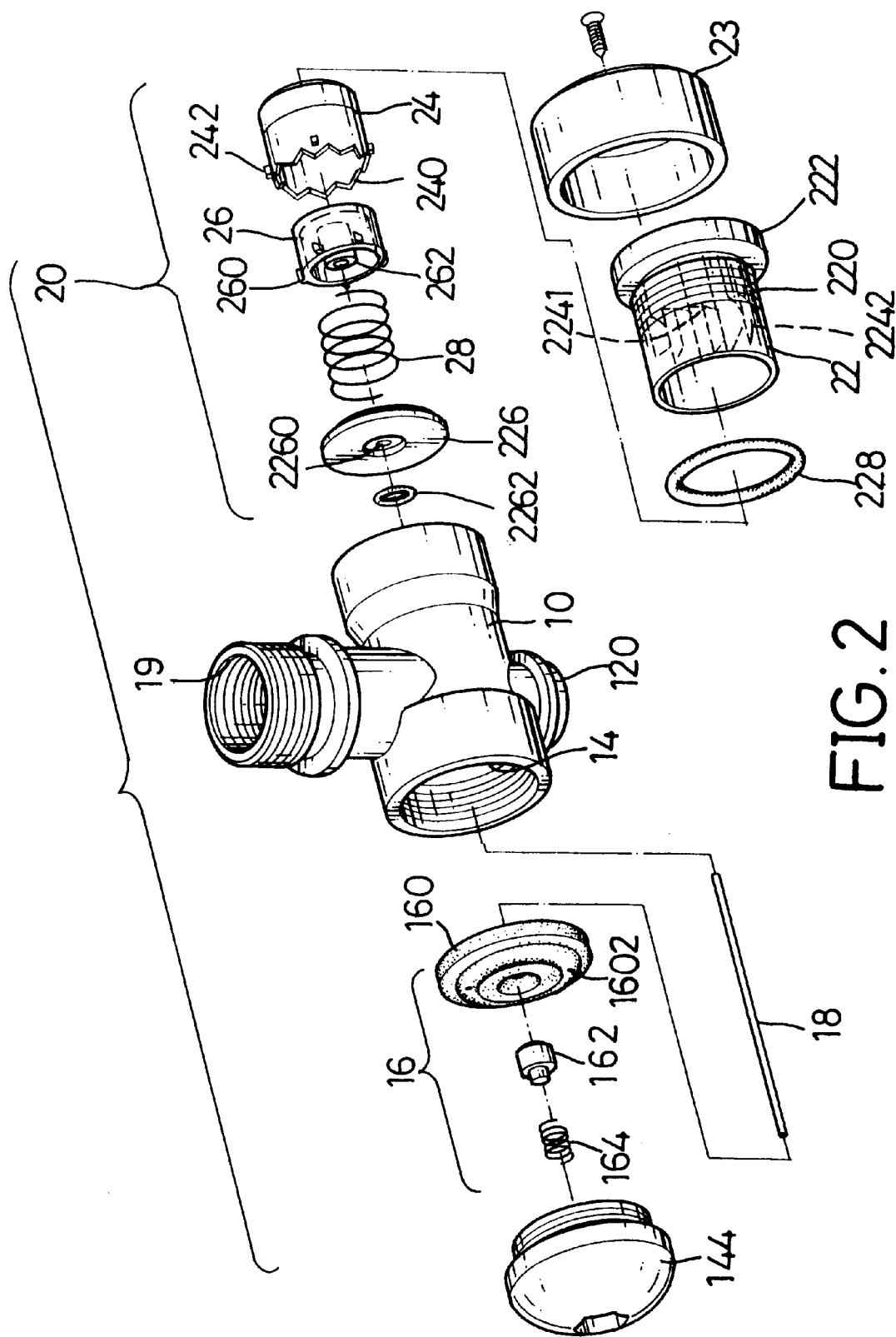
FIG. 2 is an exploded view of the valve of FIG. 1.
Figure 3:
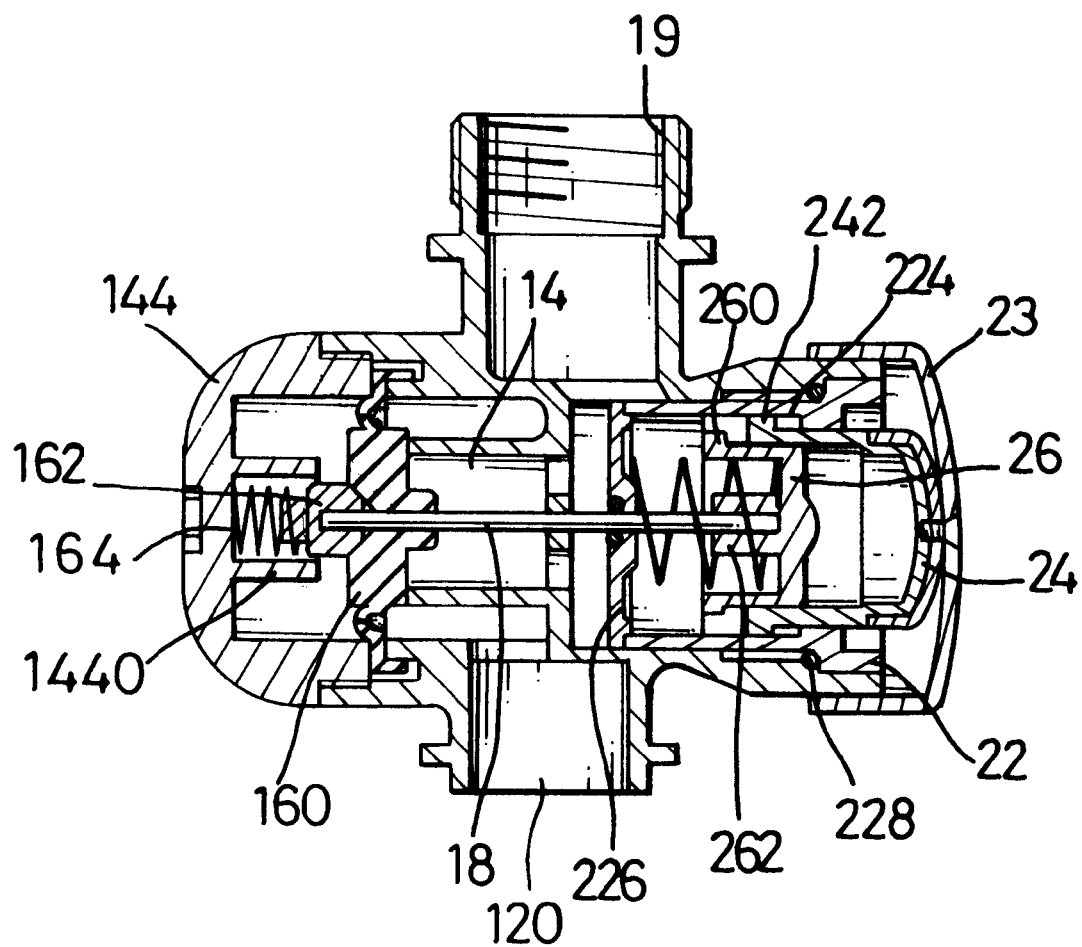
FIG. 3 is a cross sectional view of the valve of FIG. 1 showing the internal structure of the valve.

Referring to FIGS. 1, 2 and 3, a valve (10) constructed in accordance with the present invention has a body (12), a chamber (14) defined in the body (12), a pushbutton assembly (20) received in a first end of the chamber (14), and a piston assembly (16) received in a second end of the chamber (14).

The body (12) has an inlet (120) for connection with a hose (not shown), an outlet (19) for connection with a spraying device, such as a sprinkler, and a cover (144) for covering the second end of the chamber (14).

The pushbutton assembly (20) includes a hollow tubular body (22), a pushbutton (24), a rotation button (26) and a first spring (28). The hollow tubular body (22) has an outer threading (220) formed to connect with the first end of the chamber (14), a flange (222) formed on a distal end thereof to stop a scaling ring (228) that is mounted around the tubular body (22) and multiple first and second positioning slots (2241, 2242) respectively defined in an internal periphery of the body (22). The depth of the first positioning slot (2241) is greater than that of the second positioning slot (2242).

The pushbutton (24) has an open end and a closed end. The open end has an undulated edge (240) and multiple positioning bosses (242) formed near the undulated edge (240). The closed end of the pushbutton (24) is inserted into the hollow body (22). Because the multiple positioning bosses (242) are respectively received in a corresponding one of the multiple first or second positioning slots (2241, 2242), the pushbutton (24) partially extends out of the hollow body (22).

The rotation button (26) has an open end and a closed end. The rotation button (26) is received in the pushbutton (24) from the open end of the pushbutton (24) and has multiple ribs (260) formed on an outer periphery of the open end to correspond to the undulated edge (240) of the pushbutton (24). When the tubular body (22), the pushbutton (24) and the rotation button (26) are assembled, the multiple positioning bosses (242) are received in the first positioning slots (2241) so as to secure the engagement between the hollow body (22) and the pushbutton (24) to prevent any relative movement therebetween. The ribs (260) abut a side face of the undulated edge (240) and then are respectively received in the first positioning slots (2241). The ribs (260) of the rotation button (26) are selectively received between the first and the second positioning slots (2241,2242), which allows the rotation button (26) to be rotatably received in the pushbutton (24). The first spring (28) is inserted in the rotation button (26) from the open end of the rotation button (26) and located around a tube (262) formed inside the rotation button (26). After the tubular body (22), the sealing ring (228), the pushbutton (24), the rotation button (26) and the first spring (28) are assembled according to the previously described process, a cover (226) securely fitted in the chamber (14) and having a central opening (2260) and a seal (2262) is able to allocate the above mentioned parts in one side of the chamber (14). It is noted from FIG. 2 that a linkage (18) is provided between the piston assembly (16) and the pushbutton assembly (20). One end of the linkage (18) extends through the seal (2262), the central opening (2260) of the cover (226), the first spring (28) and rests in the tube (262). The other end of the linkage (18) extends through a piston (160) and is inserted into an abutting member (162). The abutting member (162) abuts a second spring (164) that is received in a cavity (1440) of an outer cover (144) threadingly engaged with the second end of the chamber (14).

Figure 4:
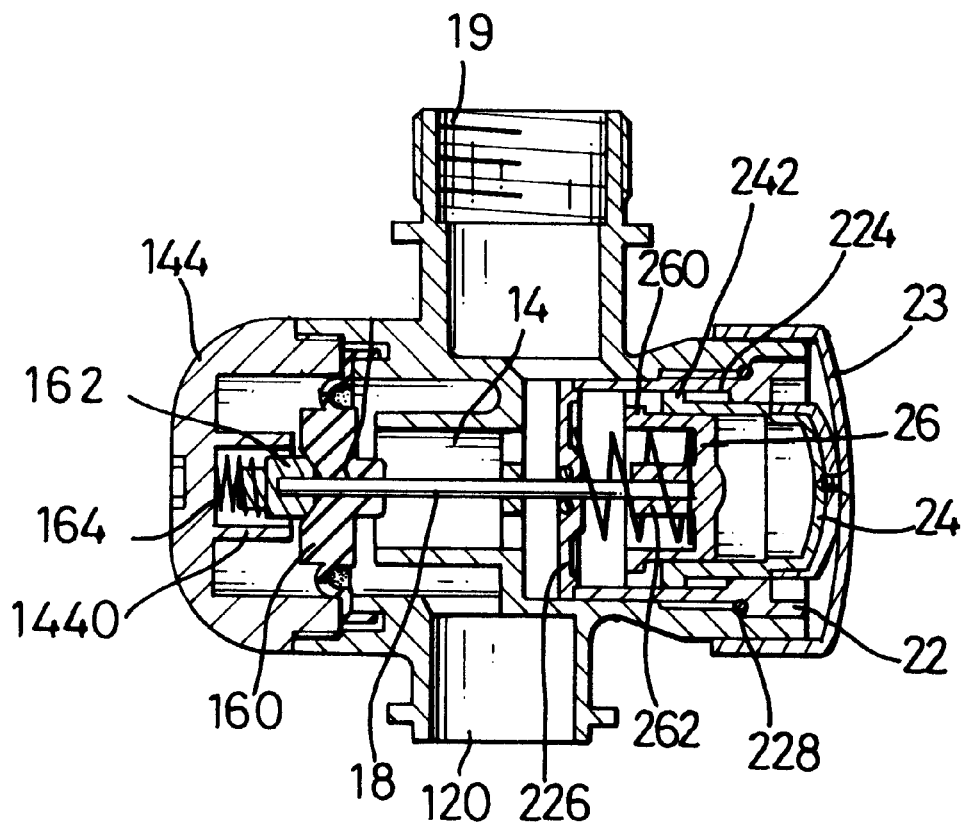
FIG. 4 is an operational view in section showing the movement of the piston in the chamber in the valve.
Figure 5A:
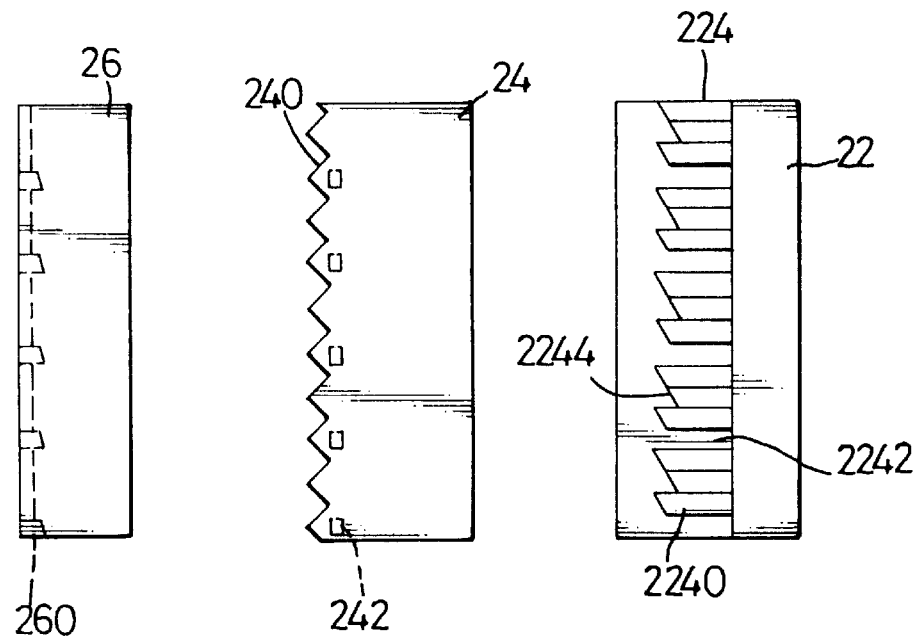
FIG. 5A is an exploded side view showing the structure of the tubular body, the pushbutton and the rotation button.

With reference to FIG. 3, an assembled valve in accordance with the present invention is shown. The assembled valve shows that the piston (160) abuts and thus closes the second end of the chamber (14) such that water from the inlet (120) can not be ejected out of the outlet (19). Furthermore, a cap (23) is securely mounted outside of the tubular body (22) and encases the pushbutton (24) therein so as to prevent materials such as dust, sand . . . etc. from entering into the pushbutton assembly (20). Referring to FIG. 4, when the pushbutton (24) is pressed toward the chamber (14), the positioning bosses (242) together with the ribs (260) slide in the first positioning slot (2241), which pushes the first spring (28) and one end of the linkage (18). The linkage (18) after being pushed will drive the abutting member (162) to press the second spring (162). Meanwhile, the water pressure in the chamber (14) will thus force the piston (160) to move toward the outer cover (144), as shown in FIG. 4, to allow the water to flow out of the outlet (19). To provide a comfortable operation mode, the body (12) is provided with a function that allows the user to maintain the piston (160) in an open state. Hereinafter is the description and principle of the mechanism.

With reference to FIGS. 5A, 5B, 5C and 5D, when the pushbutton (24), the rotation button (26) and the tubular body (22) are assembled, the positioning bosses (242) and the ribs (260) are received in the first positioning slots (2241). Furthermore, due to the undulating edge (240), the ribs (260) only stay half way in the first positioning slots (2241), which is exactly the same as that shown in FIG. 3. After the pushbutton (24) is pushed toward the chamber (14), the positioning bosses (242) slide in the first positioning slots (2241) and the ribs (260) are pushed out of the first positioning slots (2241) by the undulating edge (240). Because of the inclined side faces of the undulating edge (240), after the ribs (260) are pushed out of the first positioning slots (2241 ), the ribs (260) are forced to enter the second positioning slots (2242) each having a less length than that of each first positioning slots (2241). That is, the linkage (18) is continually pushed and thus the piston (160) is kept open to allow the water to flow out of the outlet (19), as shown in FIG. 4. However, when the user once again pushes the pushbutton (24), the ribs (260) are forced to leave the second positioning slots (2242) by the undulating edge (240). When the user stops pressing the pushbutton (24), because of the inclined side face of the undulating edge (240), the ribs (260) slide into the first positioning slots (2241) to allow the piston (160) to close the second end of the chamber (14) so as to stop the water flow out of the outlet (19), as shown from FIG. 4 to FIG. 3. To further secure the sealing effect of the piston (160) to the chamber (14), at least one aperture is provided in the piston (160), such that when the piston (160) is in its chamber closing state, the water from the inlet (120) will flow through the piston (160) by means of the aperture (1602) and stays between the piston (160) and the outer cover (144). Accordingly, the water in between the outer cover (144) and the piston (160) will further force the piston (160) toward the chamber (14) to secure the watertight engagement.

Figure 6:
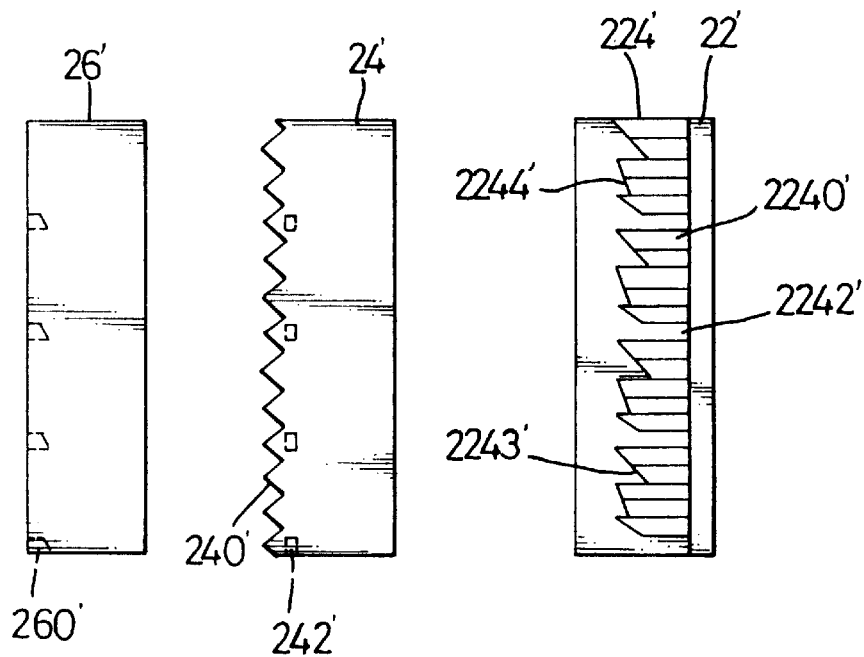
FIG. 6 shows a different preferred embodiment of the structure of the rotation button, the pushbutton and the tubular body.
Figure 5B:
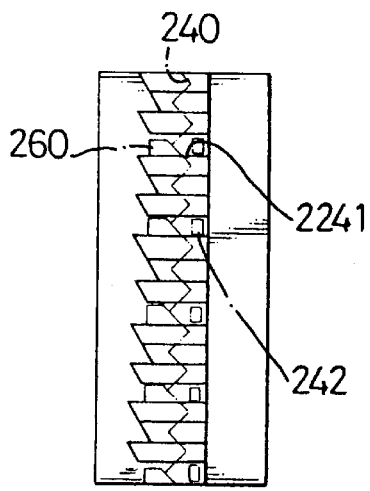
FIG. 5B is a schematic side view showing the engagement of the tubular body, the pushbutton and the rotation button.
Figure 5C:
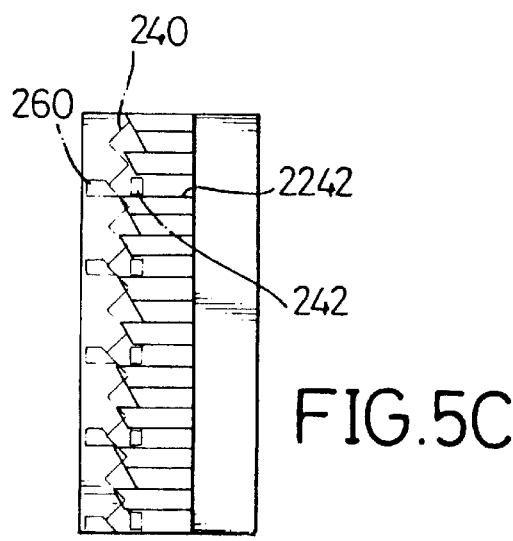
FIG. 5C is a schematic side view showing the movement rotation button by the trigger of the pushbutton.
Figure 5D:
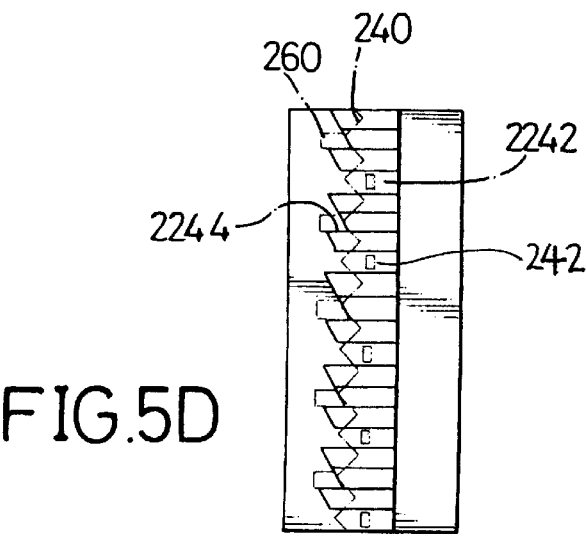
FIG. 5D is a schematic side view showing the shift of the rotation button due to the engagement between the ribs and the positioning bosses.

With reference to FIG. 6. another preferred embodiment of the invention is shown. In this embodiment, the structure is somewhat similar to that shown in FIG. 2. The difference therebetween is that the hollow tubular body (22') has multiple guiding blocks (224') spatially formed in an internal face of the tubular body (22'). Because of the provision of the multiple guiding blocks (224'), multiple first positioning slots (2242'), second positioning slots (2243') and third positioning slots (2244') are respectively defined among the guiding blocks (224'). Each of the first positioning slots (2242') has a length longer than that of each of the second positioning slots (2243'). Each of the second positioning slots (2243') has a length greater than that of each of the third positioning slots (2244').

The pushbutton (24') has an undulating edge (240') formed on the open end thereof and multiple positioning bosses (242') having a total number corresponding to that of the first positioning slots (2242').

The rotation button (26') has multiple ribs (260') having a total number corresponding to that of the first positioning slots (2242').

When the tubular body (22'), the pushbutton (24') and the rotation button (26') are assembled as in the previously described manner, the multiple positioning bosses (242') and the ribs (260') are respectively received in the first positioning slots (2242') and the ribs (260') are in engagement with the inclined side face of the undulated edge (240'), which makes the ribs (260') extend only half way into the first positioning slots (2242'). When the pushbutton (24') is pushed toward the chamber (14), the ribs (260') are pushed out of the first positioning slots (2242'). Due to the inclined side face of the undulated edge (240') and the free end of the ribs (260'), the ribs (260') are forced to be received in the second positioning slots (2243') to maintain the piston (160) away from the engagement with the chamber (14), such that the water from the inlet (120) will continue to flow out of the outlet (19). If the pushbutton (24') is pushed again, the ribs (260') are forced to leave the limit of the second positioning slots (2243') and into the third positioning slots (2244') in the same manner as described earlier, which allows the valve of the invention to have a smaller amount of water outflow from the outlet (19). Therefore, the user thus has three different water flow controls: stop, medium and small.

Figure 7:
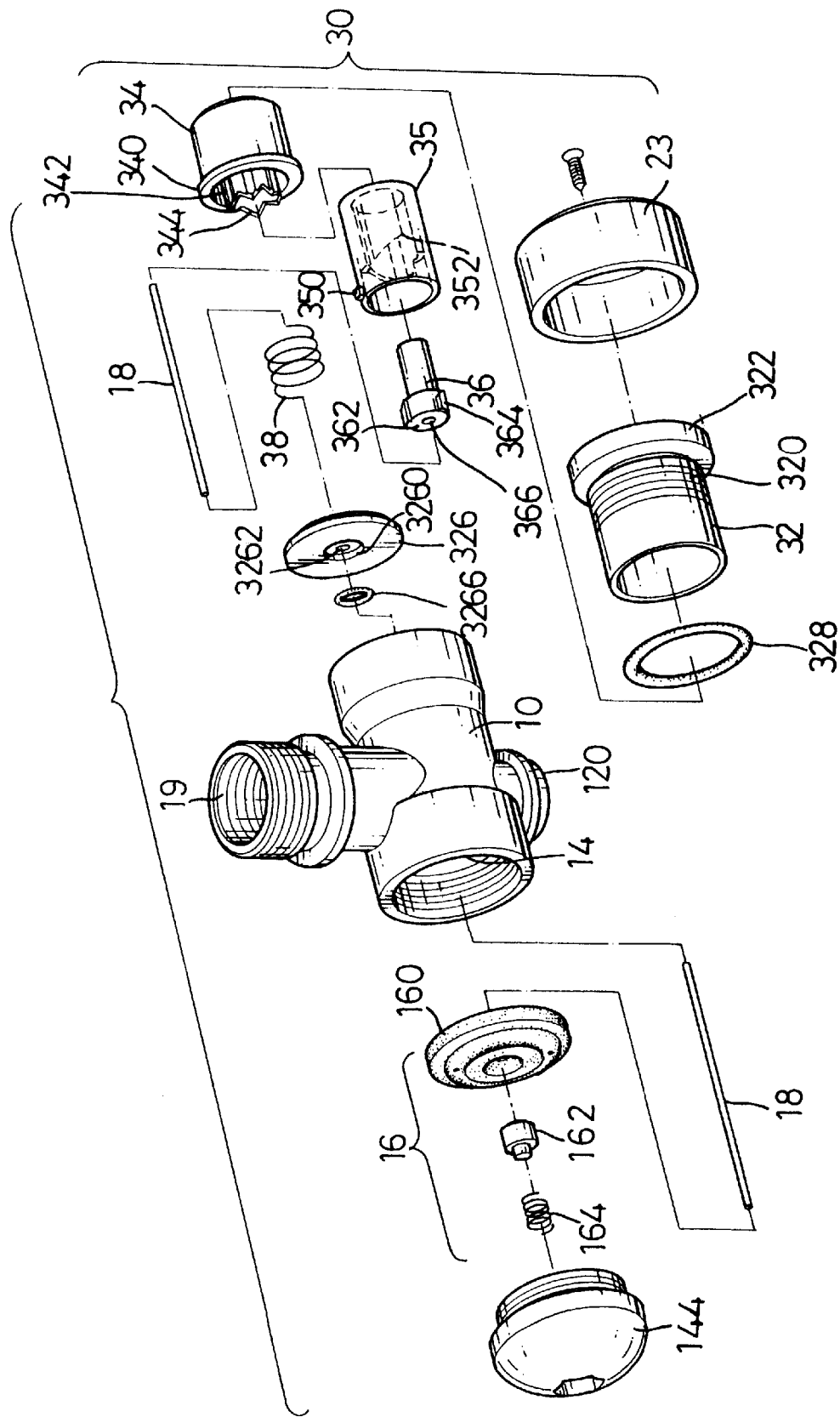
FIG. 7 is an exploded perspective view of a still another preferred embodiment of the invention.

Referring to FIG. 7, another preferred embodiment of the invention is shown. The valve (10) has a body (12), a piston assembly (16) received in a chamber (14) in the body (12) and a linkage (18) movably received in the chamber (14) and engaged with the piston assembly (16). The parts described above are the same as that described in FIG. 2. The difference resides in the following description.

The valve (10) further has a pushbutton assembly (30) received in the chamber (14) and relative to the piston assembly (16). The pushbutton assembly (30) has a tubular body (32), a pushbutton (34), a controlling sleeve (35), a rotation button (36) and a spring (38).

Figure 8:
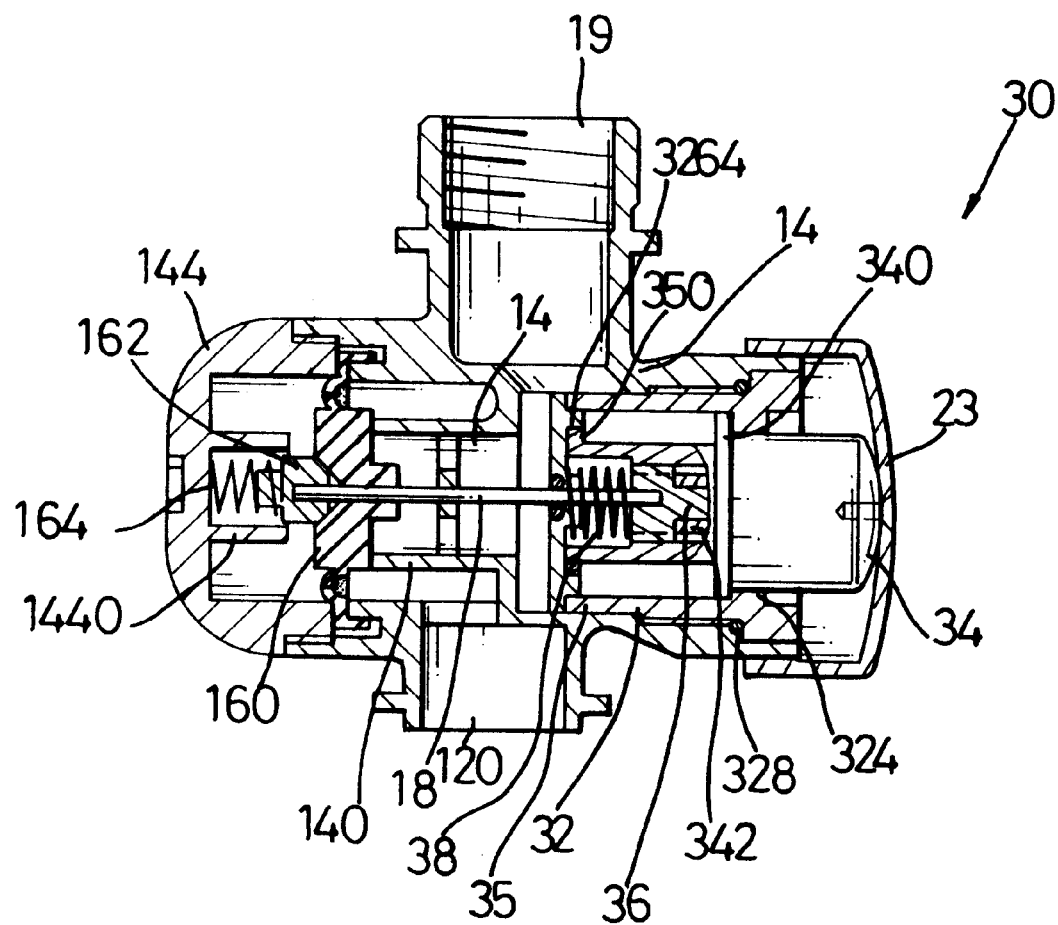
FIG. 8 is a cross sectional view showing the internal structure after the parts in FIG. 7 are assembled.

The tubular body (32) has a threading (320) for assembly with the body (12), a flange (322) formed on a distal end thereof for limiting the movement of a sealing ring (328) after being mounted around the tubular body (32) and a step (324) formed on a inside periphery thereof, as shown in FIG. 8.

The pushbutton (34) has an open end and a closed end. The pushbutton (34) further has a block ring (340) formed near the open end, and an inner tube (342) formed inside the pushbutton (34) and having an undulating edge (344) formed on a free end thereof. The pushbutton (34) is inserted in the tubular body (32) and the block ring (340) engages the step (324) so as to limit the further insertion of the pushbutton (34) into the tubular body (32).

The controlling sleeve (35) is received in the pushbutton (34) and outside the inner tube (342). The controlling sleeve (35) has a stop (350) formed on an outer periphery thereof and multiple positioning slots (352) defined in an inner periphery thereof. The positioning slots (352) are composed of multiple first positioning slots (3520) and multiple second positioning slots (3522). Each first positioning slot (3520) has a length greater than that of each second positioning slot (3522).

The rotation button (36) is movably received in the controlling sleeve (35) and has a head (362) formed on a distal end thereof. The head (362) has at least one boss (364) formed on an outside periphery thereof to correspond to one of the first and second positioning slots (3520,3522) of the controlling sleeve (35), and a blind hole (366) defined in a center thereof. The rotation button (36) is inserted into the controlling sleeve (35) from a distal end relative to the head (362). After the rotation button (36) is inserted in the controlling sleeve (35), the boss (364) is received in one of the multiple positioning slots (352) and abuts an inclined side face of the undulating edge (344). A distal end of the spring (38) engages with an outside face of the head (362).

After the pushbutton (34), the controlling sleeve (35), the rotation button (36) and the spring (38) are assembled in the tubular body (32), a cover (326) is provided to enclose the above mentioned parts in the tubular body (32).

Figure 9:
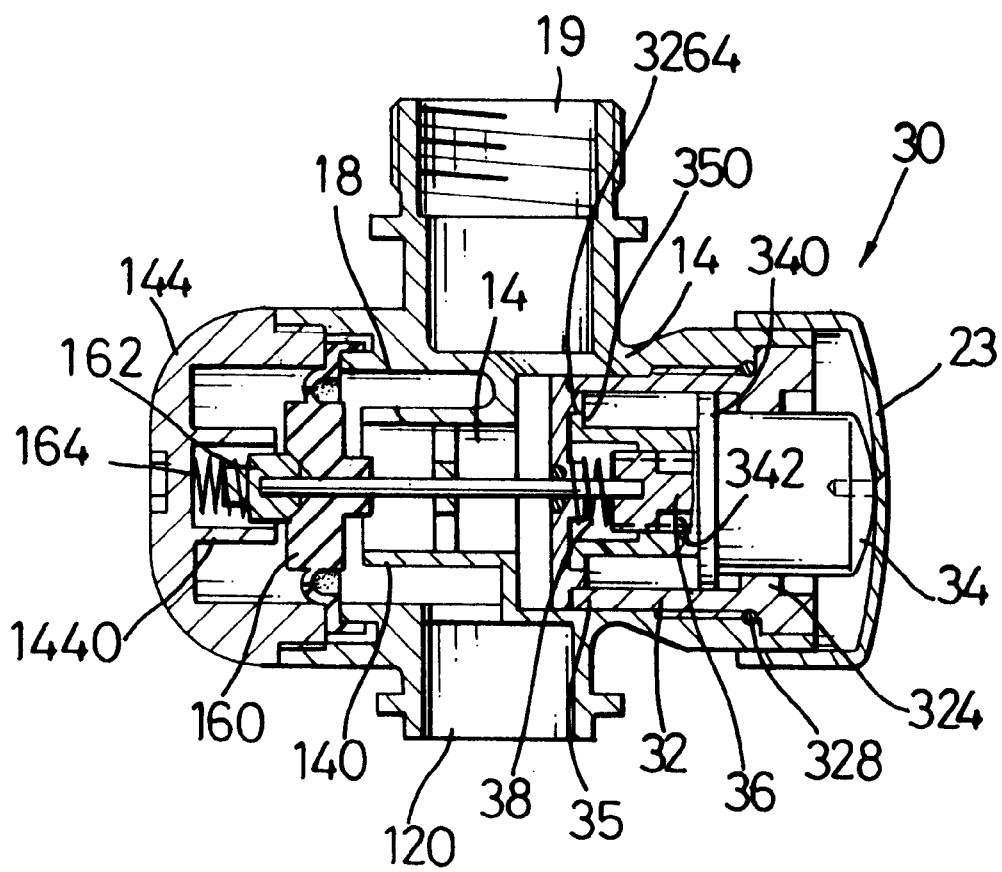
FIG. 9 is a cross sectional view showing the operation of the piston when the pushbutton is pressed.
Figure 10:
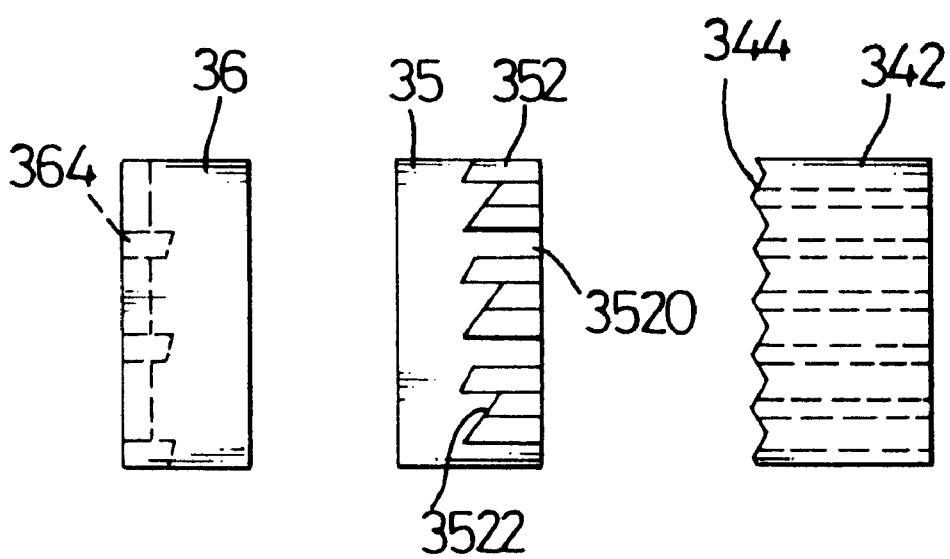
FIG. 10 is an exploded side view showing the structure of the pushbutton, the controlling sleeve and the rotation button.

The cover (326) has a recess (3260) for receiving therein a securing ring (3266), a through hole (3262) in a bottom face defining the recess (3260) and a notch (3264) defined in a back face of the cover (326) and corresponding to the stop (350) of the controlling sleeve (35). When the pushbutton (34) is pressed toward the chamber (14), the inclined side face of the undulating edge (344) pushes the boss (364) of the rotation button (36) away from the limit of the first position slot (3520). After the boss (364) is pushed away from the limit of the first positioning slot (3520), due to the provision of the relative end faces of the boss (364) and the inclined side face of the undulating edge (344), the boss (364) slides into the second positioning slot (3522). Referring to FIG. 9 and taking FIG. 10 for reference, when the piston (160) is in watertight engagement with the chamber (14), the boss (364) is received in the first positioning slot (3520). After the pushbutton (34) is pressed, the boss (364) leaves the limit of the first positioning slot (3520) and falls into the second positioning slot (3522). Because each first positioning slot (3520) has a length greater than that of each second positioning slot (3522), the piston (160) will not engage with the chamber (14), and thus water is allowed to enter the chamber (14) and exit from the outlet (19).

Furthermore, a cap (23) is securely mounted outside of the tubular body (22) and encases the pushbutton (24) therein so as to prevent materials such as dust, sand . . . etc. from entering into the pushbutton assembly (20).

While the boss (364) stays in the second positioning slot (3522), the user will not have to continue pressing the pushbutton (34), which brings convenience to the user.

Figure 11:
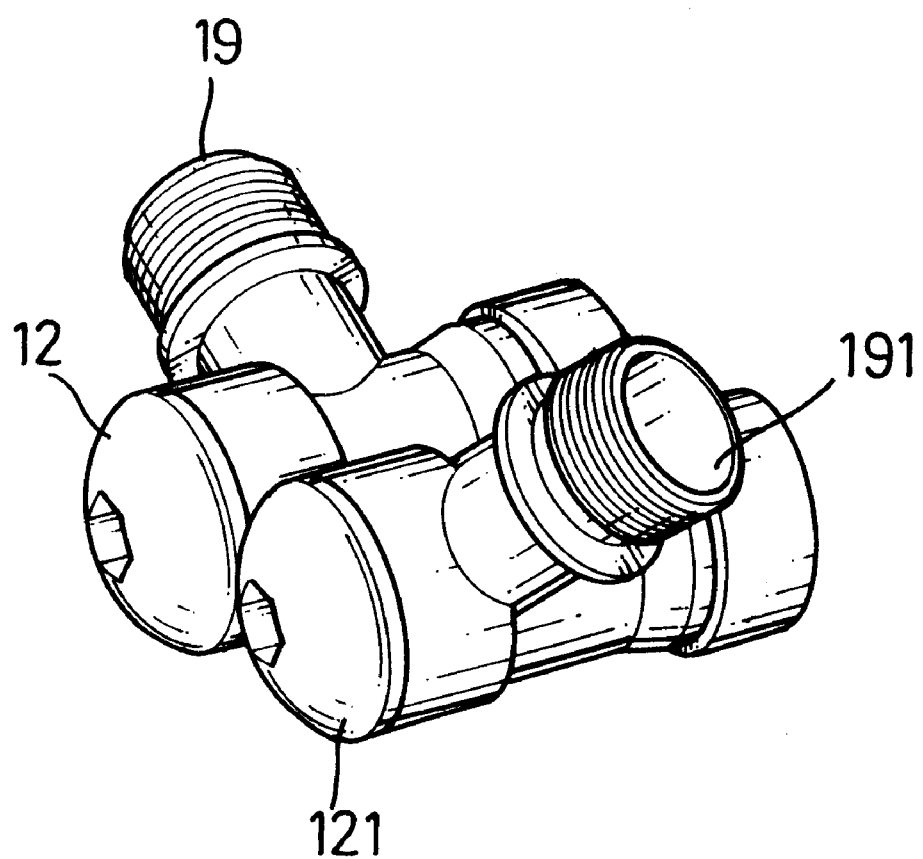
FIG. 11 is a perspective view showing still a preferred embodiment of the valve constructed in accordance with the present invention.

With reference to FIG. 11. it is to be noted that the valve of the invention can be constructed to have two separate but connected bodies (12,12')), one joint inlet (120) and two separate outlets (19,19'). Each of the bodies (12,12') has a complete pushbutton assembly and a complete piston assembly (16), such that water flow is able to be selectively controlled to eject out from one or both outlets (19,19') of the valve. An angle exists between the two outlets (19,19'), such that the effective area of the valve is greatly increased.

It is to be understood however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A valve comprising:
   a body having an inlet for connecting with a water source, an outlet selectively communicating with the inlet and a chamber defined for receiving therein a piston assembly for controlling the communication between the inlet and the outlet;
   a pushbutton assembly received in the chamber relative to the piston assembly for controlling actuation of the piston assembly; and
   a linkage provided between the piston assembly and the pushbutton assembly to drive movement of a piston in the chamber;
   wherein the piston assembly further comprises:
   an abutting member for receiving therein a first distal end of the linkage after extending through the piston;
   a first spring a first end of which engages with the abutting member; and
   an outer cover threadingly engaged with the body to cover a first opening of the chamber and to enclose the first spring, the abutting member and the piston in the chamber.

2. The valve as claimed in claim 1, wherein the pushbutton assembly comprises:
   a tubular body threadingly engaged with the body to cover a second opening of the chamber and having a flange formed on a distal end thereof to stop a sealing ring that is mounted around the tubular body and multiple positioning slots respectively defined in an internal periphery of the body;
   a pushbutton having an open end provided with an undulated edge and multiple positioning bosses formed near the undulated edge and corresponding to a respective one of the multiple positioning slots and a closed end inserted into and extending out of the tubular body;
   a rotation button movably received in the pushbutton and having multiple ribs formed on an outer periphery thereof to engage with the undulated edge of the pushbutton and detachably connected with the multiple positioning slots of the pushbutton;

a second spring inserted in the rotation button and located around a tube in the rotation button; and a cover securely formed in the chamber and having a central opening and a seal enabling to allocate the above mentioned parts in one side of the chamber;

wherein each of the ribs abuts a respective one of a plurality of inclined side faces of the undulating edge so that the rotation button is movably received in the pushbutton when the pushbutton is pushed.

3. The valve as claimed in claim 2, wherein one end of the linkage extends through the seal, the central opening of the cover, the second spring and rests in the tube of the rotation button.

4. The valve as claimed in claim 2, wherein the positioning slots comprise multiple first positioning slots and multiple second positioning slots and each first positioning slot has a length greater than that of each second positioning slot.

5. The valve as claimed in claim 4, wherein the ribs are selectively received in the first positioning slots and the second positioning slots thereby the rotation button is rotatably received in the pushbutton.

6. The valve as claimed in claim 2, wherein the positioning slots comprise multiple first positioning slots, multiple second positioning slots and multiple third positioning slots;

wherein each first positioning slot has a length greater than that of each second positioning slot; and wherein each second positioning slot has a length greater than that of each third positioning slot;

thereby the piston has three different positions to control the communication of the inlet to the chamber.

7. The valve as claimed in claim 2, wherein the pushbutton assembly comprises:

a tubular body having a threading for assembly with the body, a flange formed on a distal end thereof for limiting the movement of a sealing ring after being mounted around the tubular body and a step formed on an inside periphery thereof;

a pushbutton movably inserted into and extending out of the tubular body and having a block ring engaged with the step to prevent further insertion into the tubular body, an inner tube formed inside the pushbutton and having an undulating edge formed on a free end thereof;

a controlling sleeve received in the pushbutton and outside the inner tube and having a stop formed on an outer periphery thereof and multiple positioning slots defined in an inner periphery thereof;

a rotation button movably and rotatably received in the controlling sleeve and having a head formed on a distal end thereof and having at least one boss formed to correspond to one of the positioning slots of the controlling sleeve and a blind hole defined in a center of the head for receiving one end of the linkage; and a cover provided to enclose the above mentioned parts in the tubular body and having a recess for receiving therein a securing ring, a through hole in a bottom face defining the recess and a notch defined in a back face of the cover and corresponding to the stop of the controlling sleeve;

wherein after the pushbutton is pressed toward the chamber, an inclined side face of the undulating edge pushes the boss of the rotation button away from the limit of the respective position slot to allow the boss to slide into adjacent positioning slot.

8. The valve as claimed in claim 7, wherein the multiple positioning slots comprise multiple first positioning slots and multiple second positioning slots, wherein each first positioning slot has a length greater than that of each second positioning slot.

9. The valve as claimed in claim 7, wherein the multiple positioning slots comprise multiple first positioning slots, multiple second positioning slots and multiple third positioning slots, wherein each first positioning slot has a length greater than that of each second positioning slot, and wherein each second positioning slot has a length greater than that of each third positioning slot.

10. The valve as claimed in claim 8, wherein each first and second positioning slots are alternatively arranged.

11. The valve as claimed in claim 9, wherein each first, second and third positioning slots are alternatively arranged.

* * * * *